United States Patent

Asada

[11] Patent Number: 4,477,837
[45] Date of Patent: Oct. 16, 1984

[54] VIDEO SIGNAL RECORDING-REPRODUCING APPARATUS

[75] Inventor: Seigo Asada, Moriguchi, Japan

[73] Assignee: Matsushita Electric Industrial Co., Ltd., Kadoma, Japan

[21] Appl. No.: 331,276

[22] Filed: Dec. 16, 1981

[30] Foreign Application Priority Data

Dec. 19, 1980 [JP] Japan ............................ 55-180683

[51] Int. Cl.³ .......................................... H04N 9/491
[52] U.S. Cl. .................................................. 358/310
[58] Field of Search ......................... 358/310, 330, 334

[56] References Cited

U.S. PATENT DOCUMENTS 4,045,812  8/1977  Verhoeven et al. ................. 358/330

Primary Examiner—Richard Murray
Attorney, Agent, or Firm—Stevens, Davis, Miller & Mosher

[57] ABSTRACT

In a chrominance signal reproduction system for a colored image signal recording-reproducing apparatus in which two chrominance differential signals I and Q are frequency modulated and superimposed on each other to be recorded, and in the reproduction of the two modulated waves the carrier frequency $f_1$ of the first modulated wave recorded in a low frequency band is converted to a higher carrier frequency $f_3$ and demodulated, the higher carrier frequency $f_3$ is selected so as to be separated from the sum frequency $f_1+f_2$ component of the carrier frequency $f_2$ component of the modulated wave recorded in the higher frequency band and the carrier frequency $f_1$ component of the modulated wave recorded in the lower frequency by more than the frequency band of the demodulated signal. By setting the frequency $f_3$ in this way, any beat interference can be eliminated from the reproduced signal of the signal recorded in the lower frequency band.

4 Claims, 8 Drawing Figures

VIDEO SIGNAL RECORDING-REPRODUCING APPARATUS

This invention relates to a video signal recording-reproducing apparatus having a small size and light weight, capable of generating a high quality reproduction signal, or more particularly, reproducing color or chrominance signals with unnecessary components largely reduced.

Most magnetic video tape recorders (hereinafter referred to as VTR) at present use the helical scan system using rotating heads. For example, in a VTR of the VHS type, the video signal is recorded at a slant with respect to a ½ inch wide tape by using two video heads which are disposed on a rotating cylinder of 62 mm diameter with 180° angularly-displaced positional relation. In the case of VTR for broadcasting, the portable VTR for ELECTRONIC NEWS GATHERING (ENG) which is small in size and light in weight is desired. The use of a VTR of ¾ inch U standard is now remarkably progressing. The VTR for ENG must not only be small and light but also must have a high quality becuase it is used for TV broadcasting. Since the VTR of ¾ inch U standard, however, has a cylinder diameter of 110 mm and a tape width of ¾ inch, there is a limit to its miniaturization. In these video signal recording systems, the luminance signal is frequency-modulated with its low frequency band eliminated and a carrier chrominance signal converted into a lower frequency band is superimposed on it. Therefore, the frequency bands of the luminance and the chrominance signals are restricted, and the video quality is not always suited to broadcasting purposes.

Therefore, a new recording method with a small size, light weight and a high video quality has been proposed, in which the luminance signal and the chrominance signal are separated from each other with recording and reproduction of them being done on different tracks. According to such a method, the band width of both the luminance and chrominance signals can be more greatly expanded than in the prior art methods.

With consideration of these facts, this invention aims at providing a small and light apparatus which can reproduce the video signal with a high quality. According to this invention, even with a cylinder diameter and a cassette as large as those of the VTR of the UHS type, a high quality video signal can be obtained. Further, the size and the weight can be made smaller than those of a prior art VTR for ENG.

Further objects, features and advantages of the present invention are hereinbelow described with reference to the following accompanying drawings in which.

Figure 1:
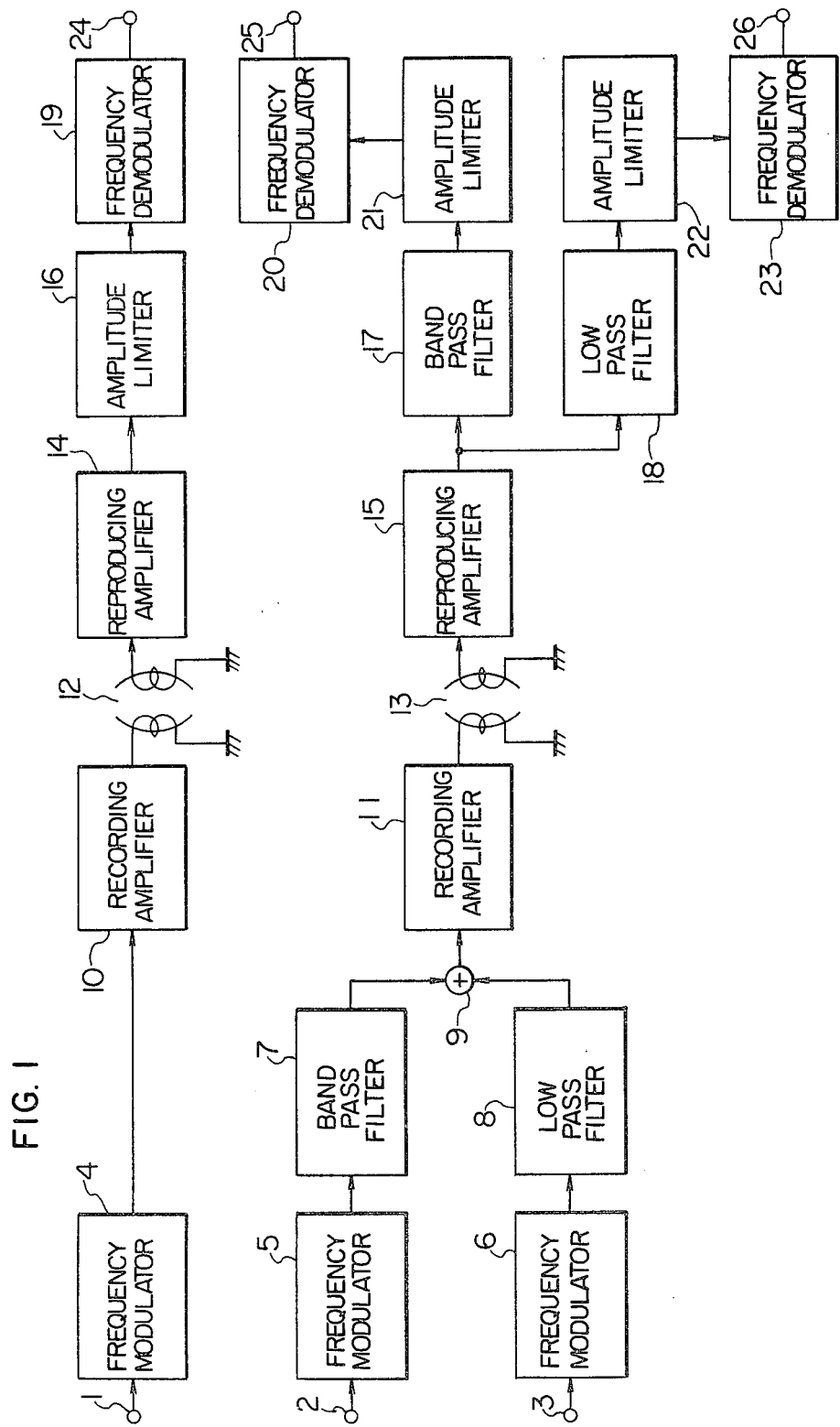
FIG. 1 is a block diagram of the circuit of a magnetic video recording and reproducing apparatus which records and reproduces the luminance and the chrominance signal by different heads.

FIG. 1 shows a block diagram of a circuit for recording and reproducing luminance and chrominance signals on separate tracks. A reference numeral 1 denotes an input terminal for the luminance signal (Y signal); 2 is an input terminal for the I signal; 3 is an input terminal for the Q signal; 4, 5 and 6 are frequency modulators; 7 is a band pass filter; 8 is a low pass filter; 9 is an adder; 10 and 11 are recording amplifiers; 12 and 13 are video heads, 14 and 15 are reproducing amplifiers; 17 is a band pass filter; 18 is a low pass filter; 16, 21 and 22 are amplitude limiters; 19, 20 and 23 are frequency demodulators; 24 is an output terminal for the Y signal; 25 is an output terminal for the I signal; and 26 is an output terminal for the Q signal.

Figure 2:
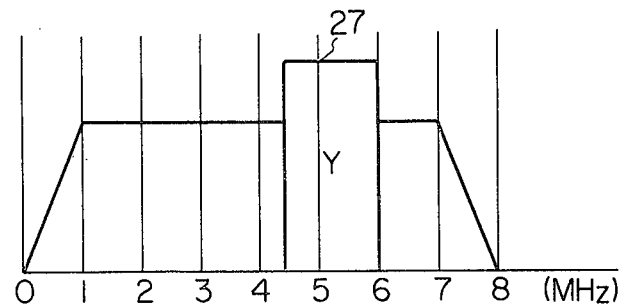
FIG. 2 shows a spectrum of a Y signal modulated by a frequency converter of FIG. 1.
Figure 3:
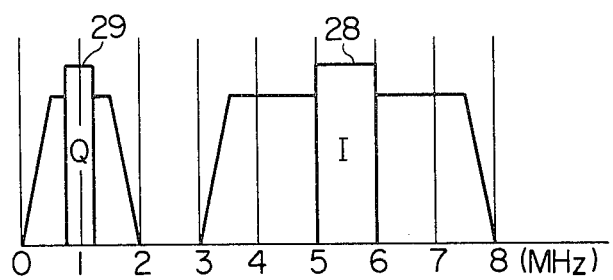
FIG. 3 shows a spectrum of I and Q signals modulated by a respective frequency modulator of FIG. 1.

In FIG. 1, the Y signal is applied to the input terminal 1 and modulated by the frequency modulator 4. After the signal is amplified by the recording amplifier 10, it is recorded in a tape through the head 12. The spectrum of the frequency modulated Y signal is as shown by 27 in FIG. 2. The I signal applied to the input terminal 2 is modulated by the frequency modulator 5, band-limited about from 3 MHz to 8 MHz by the band pass filter 7, and introduced into the adder 9. The Q signal applied to the input terminal 3 is modulated by the frequency modulator 6, band-limited in or not higher than about 2 MHz by the low pass filter 8, and introduced into the adder 9. The band pass filter 7 and the low pass filter 8 limits the band of the I and Q signals, respectively, such that the spectra of these frequency modulated waves are not superimposed on each other. The two signals added by the adder 9 are amplified by the recording amplifier 11 and then recorded onto a tape by the head 13. The possible frequency deviation of the I signal is about 5 to 6 MHz, while that of the Q signal is about 0.75 to 1.25 MHz. The record spectra of the chrominance signals I and Q are as shown by 28 and 29 in FIG. 3, respectively.

The Y signal and the chrominance signals (I signal and Q signal) are recorded by two pairs of heads. In the reproduction process, the Y signal picked up by the head 12 is amplified by the reproducing amplifier 14, passed through the amplitude limiter 16, and demodulated by the frequency demodulator 19. As a result, the Y signal appears reproduced at the output terminal 24. The chrominance signal picked up by the head 13 is amplified by the reproducing amplifier 15 and introduced into the band pass filter 17 and the low pass filter 18, the I signal passes the former while the Q signal passes the latter. The amplitudes of both signals are limited by amplitude limiters 21 and 22. After demodulation by frequency demodulators 20 and 23, I and Q signals appear reproduced at the output terminals 25 and 26, respectively.

Figure 4:
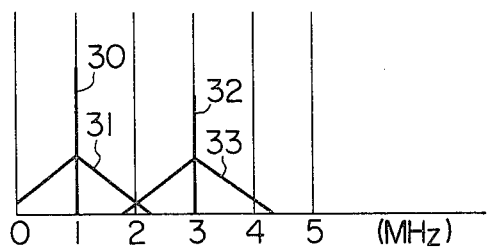
FIG. 4 shows spectra of the noise of the Q signal and the noise of the third harmonic wave of the Q signal.
Figure 5:
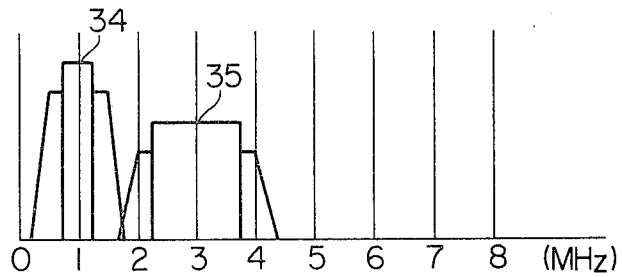
FIG. 5 shows spectra of the frequency modulated Q signal and its third harmonic wave.

In the demodulation process, since I and Q signals are made to pass through amplitude limiters (hereinafter referred to as limiters) to remove any amplitude variation, third harmonic waves appear, the level of which is lower than that of the fundamental waves by about 10 dB. Furthermore, the reproduced signals contain noise. If the signal frequency is low, noise components of the third harmonic wave enter within the band width of the fundamentals and generate beat waves through an interaction with the noise of the fundamentals. FIG. 4 shows spectra of the reproduced Q signal 30 at one frequency and the noise 31 thereof, and spectra of the third harmonic wave 32 and the noise thereof 33 that are generated by the limiter. The same effect as caused by the noise happens also between side bands of each signal. Namely, as can be understood from FIG. 5, the side bands of the fundamental wave 34 overlap with those of the third harmonic wave 35, thereby generating beat waves. This invention aims at removing these shortcomings. One embodiment of this invention will be explained next with reference to the Figures.

An essential point of this invention is to locate the third harmonic waves generated by the limiters and unnecessary components generated by the frequency converters, out of the frequency band of the Q signal by means of converting the frequency of the reproduced Q signal into a high frequency band before the signal is demodulated and to set, for the purpose, a carrier wave frequency $f_3$ to which the Q signal frequency is converted in the high frequency conversion.

Figure 7:
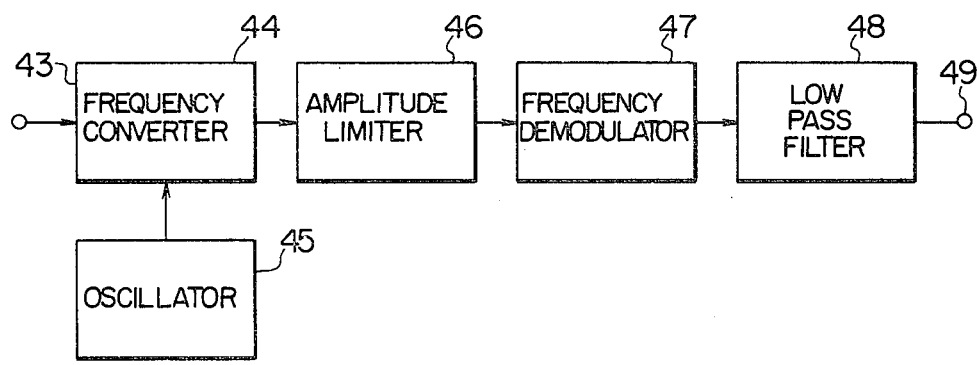
FIG. 7 is a block diagram showing the main part of one embodiment of this invention.

A circuit construction for eliminating the beats between the noise of the fundamental waves and that of the third harmonic waves as well as the beats between the side bands of the fundamental wave and those of the third harmonic wave will be explained next in conjunction with FIG. 7. In this Figure, a reference numeral 43 denotes an input terminal for the output signal of the low pass filter of FIG. 1; 44 is a frequency converter; 45 is an oscillator; 46 is a limiter; 47 is a frequency demodulator; 48 is a low pass filter; and 49 is an output terminal for the demodulated Q signal.

The frequency $f_Q$ of the Q signal (29 in FIG. 3) applied to the terminal 43 is converted to $f_G+f_Q$ by the oscillator 45 (oscillating at a frequency $f_G$) and the frequency converter 44. If $f_G$ is chosen to exceed a certain value, beats between the noise of the converter output signal and that of the third harmonic wave and beats between the side bands of the converter output signal and those of the third harmonic wave do not appear even after the converter output signal is made to pass through the limiter 46. In this manner, by converting the Q signal into a high frequency region, demodulating it by the frequency demodulator 45 and passing it through the low pass filter 46, the reproduced signal has few unnecessary components and is of good quality.

However, the frequency converter has a non-linear element. If the I signal is cut off too sharply by the low pass filter 18, distortion of the wave becomes large. Therefore, the characteristic of the low pass filter may not be made so sharp.

After the passage through the low pass filter, the signal at the filter output includes the I signal mixed with the Q signal. Namely the input signal to the frequency converter 44 contains the I signal as well as the Q signal. If the value of $f_G$ is simply chosen in such a manner that the noise or side band of the signal may not be overlapped with that of the higher harmonic component, an influence of the unnecessary components, still appears.

Therefore, the conversion frequency $f_G$ should be selected as follows.

Figure 6:
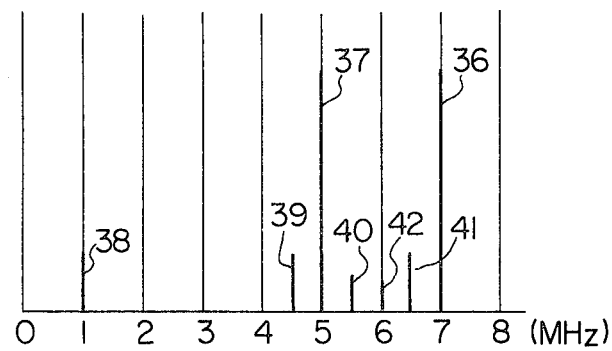
FIG. 6 shows a spectrum of the output of the frequency converter where the carrier wave of a reproduced chrominance signal is converted to a high frequency wave.

The output of the low pass filter 18 of FIG. 1 contains I signal. The output of the frequency converter 44 contains components of $f_I+f_Q$ (sum frequency of I and Q signals), $f_I-f_Q$ (difference frequency of I and Q signals), and $f_I$ (I signal) other than the components of $f_G \pm f_Q$ and $f_G$. The output of the frequency converter 44 for the case of $f_I=5.5$ MHz, $f_Q=1.0$ MHz and $f_G=6$ MHz is shown in FIG. 6. A reference numeral 36 denotes the component of $f_G+f_Q$ and 37, 38, 39, 40, 41 and 42 denote components of $f_G-f_Q$, $f_Q$, $f_I-f_Q$, $f_I+f_Q$ and $f_G$, respectively. Here, the frequency $f_I+f_Q$ is nearest to the high frequency converted one, $f_G+f_Q$. Therefore, if $f_G$ is selected that the component of $f_I+f_Q$ is apart from that of $f_G+f_Q$ by more than $f_{QW}$ (band width of the demodulation signal of Q), no harmful effect would appear.

Hence, the following relation should be satisfied.

$$(f_G+f_Q)-(f_I+f_Q)>f_{QW},$$

or $$f_G>f_{QW}+f_I. \quad (1)$$

As the frequency $f_Q$ of the first carrier wave is converted by $f_G$, the frequency $f_3$ of the third carrier wave becomes $$f_3=f_G+f_Q.$$

Figure 8:
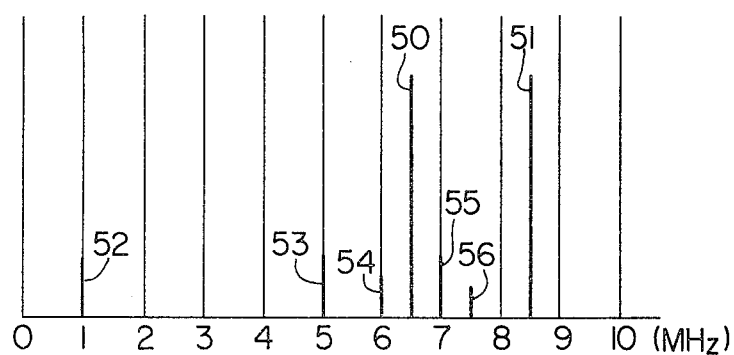
FIG. 8 shows a spectrum of the output of a frequency converter 44 of the embodiment of FIG. 7.

If this third carrier wave frequency is set as $$f_3>f_I+f_Q+f_{QW}, \quad (2)$$

any harmful effect or interference will be suppressed. Now, assuming that the frequency deviation of the Q signal is 0.75 to 1.25 MHz, that of the I signal is 5 to 6 MHz and that the demodulation signal band width $f_{QW}$ of the Q signal is 0.5 MHz; we obtain from (1)

$$f_G>6.5 \text{ MHz},$$

where the value if $f_I$ is assumed to be 6 MHz, i.e., the upper limit of the frequency deviation. FIG. 8 shows the spectrum of the output of the frequency converter for the case of $f_I=6$ MHz, $f_Q=1$ MHz, and $f_G=7.5$ MHz. In the Figure, a reference numeral 50 denotes $f_G-f_Q$, 51: $f_G+f_Q$, 52: $f_Q$, 53: $f_I-f_Q$, 54: $f_I$, 55: $f_I+f_Q$, and 56: $f_G$. As can be seen from the Figure, unnecessary components are separated from the component of $f_G+f_Q$ by more than $f_{QW}$ (=0.5 MHz). The frequency $f_3$ of the third carrier wave is given by (from the equation (2))

$$f_3=f_Q+6.5 \text{ (MHz)}.$$

By setting the third carrier wave in this way, the Q signal modulated by the third carrier wave is no longer affected by the third harmonic wave due to the limiters, nor by a leakage of the I signal.

What is claimed is:

1. An image recording-reproducing apparatus comprising:
   means for modulating a first carrier wave of a first frequency $f_Q$ by a chrominance signal component Q to produce a first modulated signal;
   means for modulating a second carrier wave of a second frequency $f_I$ by a chrominance signal component I to produce a second modulated signal, said second frequency $f_I$ being higher than said first frequency $f_Q$;
   said first and second modulated signals forming part of an image signal;
   means for superimposing said first and second modulated signals on one another;

first means for recording said superimposed first and second modulated signals on a recording medium;

means for reproducing recorded first and second modulated signals;

means for frequency converting said reproduced first modulated signal with a third carrier wave of a higher frequency $f_3$ wherein said higher frequency $f_3$ is separated from the sum of the frequencies of said first and second carrier waves by more than a frequency band width of a demodulated signal of said third carrier wave.

2. An apparatus as in claim 1 further comprising means for demodulating said frequency converted first modulated signal and for demodulating said reproduced second modulated signal.

3. An apparatus as in claim 1 wherein said chrominance components Q and I respectively represent two color information signals and further comprising means for modulating a fourth carrier wave with a luminance signal to form a third modulated signal, said image signal also including said third modulated signal; and second means for recording said third modulated signal on said recording medium.

4. An apparatus as in claim 1 wherein said first and second recording means are first and second recording heads.

* * * * *